No. 689,121. Patented Dec. 17, 1901.
B. J. PIQUET.
TIRE REPAIRING TOOL.
(Application filed May 24, 1901.)
(No Model.) 2 Sheets—Sheet 1.

WITNESSES:
Geo. W. Naylor
Fred. Acker

INVENTOR
Benjamin J. Piquet
BY
Munn
ATTORNEYS

No. 689,121.
B. J. PIQUET.
TIRE REPAIRING TOOL.
(Application filed May 24, 1901.)
Patented Dec. 17, 1901.
(No Model.)
2 Sheets—Sheet 2.
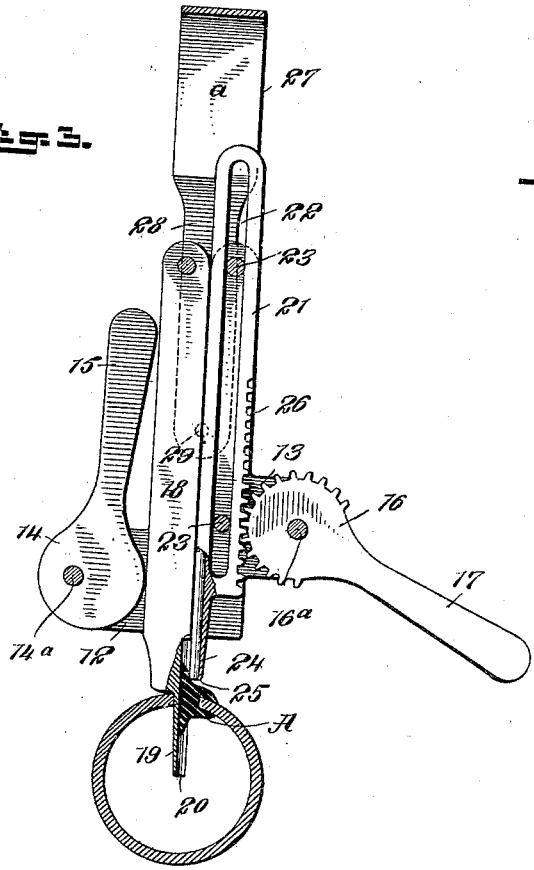
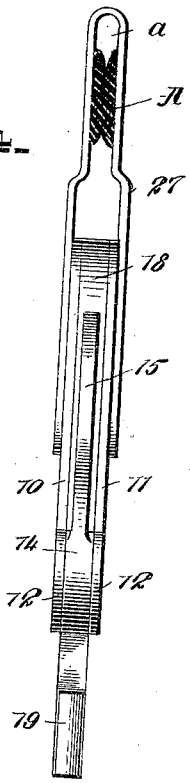
WITNESSES:
Geo. W. Naylor
J. Fred Acker
INVENTOR
Benjamin J. Piquet
BY Munn
ATTORNEYS
THE NORRIS PETERS CO., PHOTO-LITHO., WASHINGTON, D. C.

UNITED STATES PATENT OFFICE.

BENJAMIN J. PIQUET, OF WOODBURY, NEW YORK.

TIRE-REPAIRING TOOL.

SPECIFICATION forming part of Letters Patent No. 689,121, dated December 17, 1901.

Application filed May 24, 1901. Serial No. 61,722. (No model.)

*To all whom it may concern:*

Be it known that I, BENJAMIN J. PIQUET, a citizen of the United States, and a resident of Woodbury, in the county of Nassau and State of New York, have invented a new and Improved Tire-Repairing Tool, of which the following is a full, clear, and exact description.

The purpose of the invention is to provide a tool especially adapted for repairing punctures in pneumatic tires and to so construct the tool that it may be used to enlarge a puncture and to introduce through the enlarged puncture an ordinary plug or, preferably, a plug having a double head and a short connecting-shank, the shank being adapted to fill the enlarged aperture and the heads to close in contact with the inner and outer faces of the tire around the aperture in an air-tight manner.

A further purpose of the invention is to construct the tool in a simple and durable manner and so that it will be light, strong, of small size, and capable of convenient and ready manipulation.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
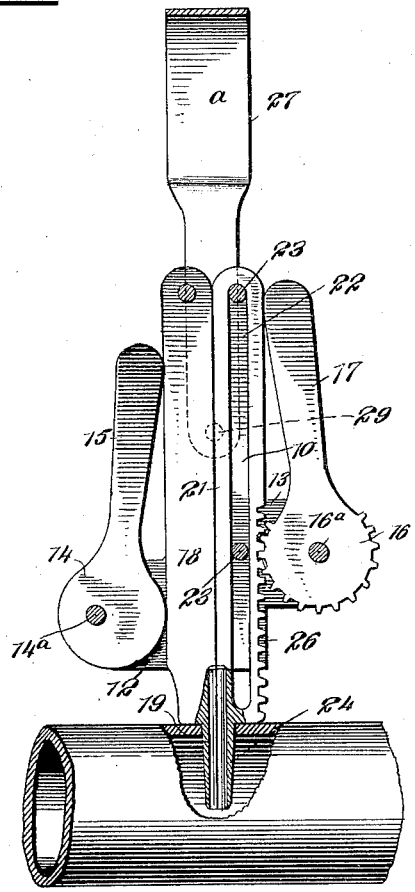
Figure 2:
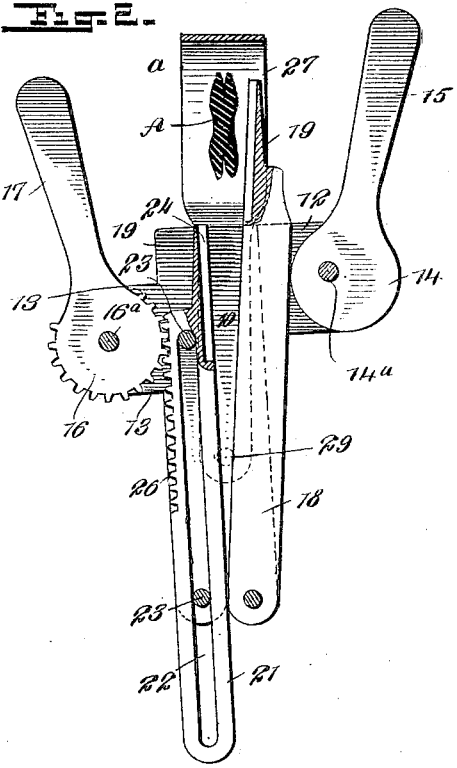
Figure 5:
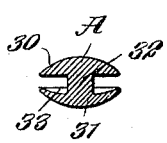
Figure 6:
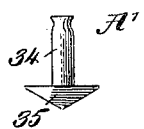

Figure 1 is a vertical section through the device, illustrating it in position to enlarge a puncture in a tire. Fig. 2 is a view similar to Fig. 1, the body of the tool being reversed and the plug being shown in position in its carrier to be engaged by the introducing sections of the tool. Fig. 3 is a vertical section through the tool, illustrating its application to a tire and a plug as partly in position in the aperture of the tire. Fig. 4 is an edge view of the improved tool, the parts being in the position shown in Fig. 1 and the plug being shown in the receiver. Fig. 5 is a vertical section through the improved form of plug especially adapted for use in connection with the tool, and Fig. 6 is a side elevation of the ordinary form of plug.

The frame consists of two plates 10 and 11, having ears or offsets 12 and 13 at opposite sides. An eccentric 14 is pivoted by a pin $14^a$ between the ears 12, which eccentric is provided with a handle 15. A pinion 16 is pivoted by a pin $16^a$ between the ears 13, having an integral or attached handle 17. A bar 18 is located between the plates 10 and 11. This bar extends longitudinally of the frame formed by the said plates 10 and 11, and its outer longitudinal edge is engaged near the free end of the bar by the eccentric 14, the opposite end of the bar being pivoted to the frame at the end opposite the end carrying the said ears. A tapering jaw 19 is formed at the free end of the bar 18, having a convexed outer and a concaved inner face, together with a sharp or cutting edge 20 at its outer end. When the eccentric 14 is moved in a manner to bring its larger portion in contact with the bar 18, as shown in Fig. 3, the bar is held longitudinally straight in the frame; but when the smaller portion of the eccentric engages with the bar 18 said bar may be swung outward at its free end, as shown in Fig. 2. A second bar 21 is located in the frame, having end or longitudinal movement between the plates 10 and 11. The sliding bar 21 is parallel with the pivoted bar 18 when the latter is forced inward by its eccentric. The sliding bar 21 is provided with a longitudinal slot 22, and guide-pins 23, connecting the plates 10 and 11, are loosely passed through the said slot. The sliding bar 21 is provided with a jaw 24 at what may be termed its "outer" end. The said jaw corresponds to the jaw 19 of the pivoted bar 18, being provided with a sharp or cutting outer end 25, and the outer face of the jaw 24 is convexed and its inner face concaved. When the two jaws 19 and 24 are brought together, they form a tubular punch, as is shown in Fig. 1. A series of teeth 26 is formed in the outer edge of the sliding bar 21, which teeth mesh with the teeth of the pinion 16, so that by moving the pinion upon its pivot the sliding bar 21 will be moved so as to carry its jaw longitudinally to or from the jaw 19 of the pivoted bar 18.

The side members of a yoke 27 are connected by pivot-pins 29 to the outer side portions of the frame, and the yoke extends some distance beyond the ends of the frame. In fact the frame can be turned end for end in the yoke. The upper or bow portion a of the yoke is of less width than the other portions, as shown in Fig. 4, and the reduced section a of the yoke constitutes a receiver for a plug used in making a repair. The plug is made of soft rubber, and the preferred form A of the plug is shown in Fig. 5. This form of plug consists of two opposing heads 30 and 31, connected by a shank 32. The outer faces of the heads are convexed and their inner faces more or less straight; but the inner face of what is intended to be the outer head of the plug, or that which is over the bore, is provided with an annular recess or cavity 33, so that the inner face of the outer head will closely adapt itself to the convexed outer face of the tire when the plug is placed in position on the tire by the tool. In Fig. 6 I have illustrated the ordinary form of plug A', consisting of a shank or stem 34 and a conical head 35.

In operation the handles of the eccentric and pinion are carried upward, whereupon the bar 18 is held in the frame against side movement in an outward direction and against the sliding bar 21, and the jaws of the two bars will extend the same distance beyond an end of the frame and in close contact with each other, forming a tubular punch. This punch is then introduced into the tire at the puncture to produce a clear round aperture, as shown in Fig. 1. The aperture having been made, the jaws are drawn from the tire and the frame is turned end for end in the yoke. The pinion is now turned until the jaw of the sliding bar 21 is drawn within the frame, and the eccentric 14 is also turned until its smaller portion is presented to the pivoted bar 18, and the said bar is then swung slightly outward, as shown in Fig. 2. Next the plug A is placed in the receiving-section a of the yoke, and before the plug is thus placed the heads of the plug are drawn outward in opposite directions and pressed or flattened to lie as nearly as possible in line with the stem 32. The sliding bar 21 is now run outward, and its jaw 24 is brought at one side of the pressed plug, and the eccentric is manipulated to force the jaw 19 against the opposite side of the plug. The plug will now be held in a flattened condition between the jaws 19 and 24. The frame is again reversed, bringing the jaws to their lower position, and the jaws are introduced into the aperture in the tire. Next the jaw 24 is drawn upward and out from the tire, as shown in Fig. 3, and one portion of the two heads of the plug in expanding will engage one with the outer and the other with the inner face of the tire, and upon withdrawing the other jaw 19 the remaining portion of the heads will take a similar position, completely closing the aperture in an air-tight manner.

Having thus described my invention, I claim as new and desire to secure by Letters Patent—

1. A tire-repairing tool, comprising a frame, and a pair of jaws one of which is arranged to slide on the frame the other being mounted to swing on the frame to and from the sliding jaw.

2. In a tire-repairing tool a pair of jaws having cutting-segments, the jaws having a relative swinging and sliding movement.

3. In tire-repairing tools, a pair of jaws composed of relatively movable cutting-segments, the said jaws being capable of holding a plug between them in a compressed condition.

4. In tire-repairing tools, a pair of jaws one of which is arranged to slide, the other being pivotally mounted and having movement to and from the sliding jaw, a locking and limiting device for the pivoted jaw, and means for moving the sliding jaw, substantially as described.

5. In tire-repairing tools, a pair of jaws, one of which is arranged to slide, the other being pivotally mounted and capable of movement to and from the sliding jaw, a gear and rack for imparting movement to one jaw, and a cam for swinging and holding the other jaw, as described.

6. In tire-repairing tools, a frame, a yoke pivotally attached to the frame, in which yoke the frame may be turned end for end, the said yoke having a receiving-section for the reception of a plug, a pair of jaws one of which is arranged to slide in the frame, the other having pivotal connection with the frame and movement to and from the sliding jaw, the jaws being segmental and provided with sharp outer ends, a cam for swinging and holding the pivoted jaw, and a rack and gear for imparting movement to the sliding jaw, as set forth.

7. In tire-repairing tools, a pair of jaws composed of relatively movable cutting-segments and a plug of elastic material comprising opposing heads and a connecting-stem, which plug is compressed between the said jaws, means for holding the plug between the jaws and for moving one of the jaws from engagement with the plug, the heads of said plug having convexed outer faces and substantially straight inner faces, the inner face of one head being more or less concaved, as described.

8. A plug adapted to be used in connection with tire-repairing tools, the said plug being constructed of a yielding material, comprising opposing heads having their opposing faces more or less straight and their outer faces convexed, the inner face of one of said heads being provided with an annular recess or cavity, for the purpose set forth.

9. A tire-repairing tool, comprising a frame, and a pair of jaws one of which is mounted to swing and the other to slide on the frame, the jaws having cutting edges, as set forth.

10. A tire-repairing tool, comprising a frame, a slotted bar having guided longitudinal movement in the frame and provided with a jaw at one end, and a second bar pivoted to the frame and provided with a corresponding jaw, as set forth.

In testimony whereof I have signed my name to this specification in the presence of two subscribing witnesses.

BENJAMIN J. PIQUET.

Witnesses:
CARLE MARMARO,
ADOLPH LANG.